(12) United States Patent
Cherney et al.

(10) Patent No.: US 8,528,675 B2
(45) Date of Patent: Sep. 10, 2013

(54) ELECTRICAL CABINET (75) Inventors: Mark J. Cherney, Potosi, WI (US);
Troy A. Coakley, Dubuque, IA (US);
Joseph S. Sauvageau, Osbow, ND (US);
Devendra Thakur, Pune (IN)

(73) Assignee: Deere & Company, Moline, IL (US)

( * ) Notice: Subject to any disclaimer, the term of this patent is extended or adjusted under 35 U.S.C. 154(b) by 190 days.

(21) Appl. No.: 13/038,846

(22) Filed: Mar. 2, 2011

(65) Prior Publication Data
US 2012/0224942 A1 Sep. 6, 2012

(51) Int. Cl.
*B60K 6/42* (2007.10)

(52) U.S. Cl.
USPC ............... 180/65.22; 180/65.265; 180/65.27; 180/65.275

(58) Field of Classification Search
USPC ............................................ 180/65.1–65.29
See application file for complete search history.

(56) References Cited

U.S. PATENT DOCUMENTS

| 7,032,695 | B2* | 4/2006 | Beihoff et al. ............... 180/65.1 |
| 7,808,775 | B2* | 10/2010 | Cherney et al. ............... 361/624 |
| 2009/0266632 | A1 | 10/2009 | Hill et al. |
| 2009/0308675 | A1* | 12/2009 | Sato ......................... 180/65.285 |

OTHER PUBLICATIONS

Bucyrus "Mining Trucks"as early as Feb. 18, 2011, also can be found at www.bucyrus.com/media/103402/trucks_us_br_050510_1r.pdf, (12 pgs.).

* cited by examiner

*Primary Examiner* — Jeffrey J Restifo
*Assistant Examiner* — Erez Gurari
(74) *Attorney, Agent, or Firm* — Faegre Baker Daniels LLP (57) ABSTRACT

An electric drive work vehicle is provided having a chassis, at least one power distribution system, and a cabinet that houses the at least one power distribution system. The cabinet may be mounted atop the chassis to shield the cabinet and its contents from ground water and debris.

23 Claims, 12 Drawing Sheets

ELECTRICAL CABINET

FIELD OF THE DISCLOSURE

The present disclosure relates to work vehicles and, more particularly, to electric drive work vehicles.

BACKGROUND OF THE DISCLOSURE

Electric drive vehicles use one or more electric traction motors for propulsion. In certain embodiments, the electrical power source that powers the traction motors is a hybrid system that includes a combustion engine/electric generator arrangement. In other embodiments, the electrical power source that powers the traction motors includes a battery arrangement or a fuel cell arrangement, for example. On wheeled, electric drive work vehicles, four traction motors may be provided, one at each wheel.

SUMMARY

The present disclosure provides an electric drive work vehicle having a chassis, at least one power distribution system, and a cabinet that houses the at least one power distribution system. The cabinet may be mounted atop the chassis to shield the cabinet and its contents from ground water and debris.

According to an embodiment of the present disclosure, an electric drive work vehicle is provided having a front end and a rear end, a longitudinal axis extending from the front end to the rear end of the work vehicle. The work vehicle includes a chassis, an operator cab supported by the chassis, the operator cab housing an operator of the work vehicle, a platform supported by the chassis, the platform providing access to the operator cab, an engine, at least one traction device positioned to support the chassis on the ground, at least one electric traction motor operatively coupled to the at least one traction device to propel the chassis across the ground, at least one power distribution system that distributes power from the engine to the at least one electric traction motor, and a cabinet that houses the at least one power distribution system, at least a portion of the cabinet being located above the platform and longitudinally forward of the engine.

According to another embodiment of the present disclosure, an electric drive work vehicle is provided having a front end and a rear end, a longitudinal axis extending from the front end to the rear end of the work vehicle. The work vehicle includes a chassis, a work tool moveably coupled to the chassis, at least one hydraulic cylinder configured to move the work tool relative to the chassis, a tank in fluid communication with the at least one hydraulic cylinder to supply hydraulic fluid to the at least one hydraulic cylinder, an operator cab supported by the chassis, the operator cab housing an operator of the work vehicle, a power source, at least one traction device positioned to support the chassis on the ground, at least one electric traction motor operatively coupled to the at least one traction device to propel the chassis across the ground, at least one power distribution system that distributes power from the power source to the at least one electric traction motor, and a cabinet that houses the at least one power distribution system, the cabinet being located above the tank.

According to yet another embodiment of the present disclosure, an electric drive work vehicle is provided having a front end and a rear end, a longitudinal axis extending from the front end to the rear end of the work vehicle. The work vehicle includes a chassis, a work tool moveably coupled to the chassis at the front end of the work vehicle, an operator cab supported by the chassis, the operator cab housing an operator of the work vehicle, a platform supported by the chassis, the platform providing access to the operator cab, a power source, at least one traction device positioned to support the chassis on the ground, at least one electric traction motor operatively coupled to the at least one traction device to propel the chassis across the ground, at least one power distribution system that distributes power from the power source to the at least one electric traction motor, and a cabinet that houses the at least one power distribution system, at least a portion of the cabinet being located above the platform and longitudinally rearward of the work tool.

BRIEF DESCRIPTION OF THE DRAWINGS

The above-mentioned and other features and advantages of this disclosure, and the manner of attaining them, will become more apparent and the disclosure itself will be better understood by reference to the following description of embodiments of the disclosure taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the invention in any manner.

DETAILED DESCRIPTION

Figure 1:
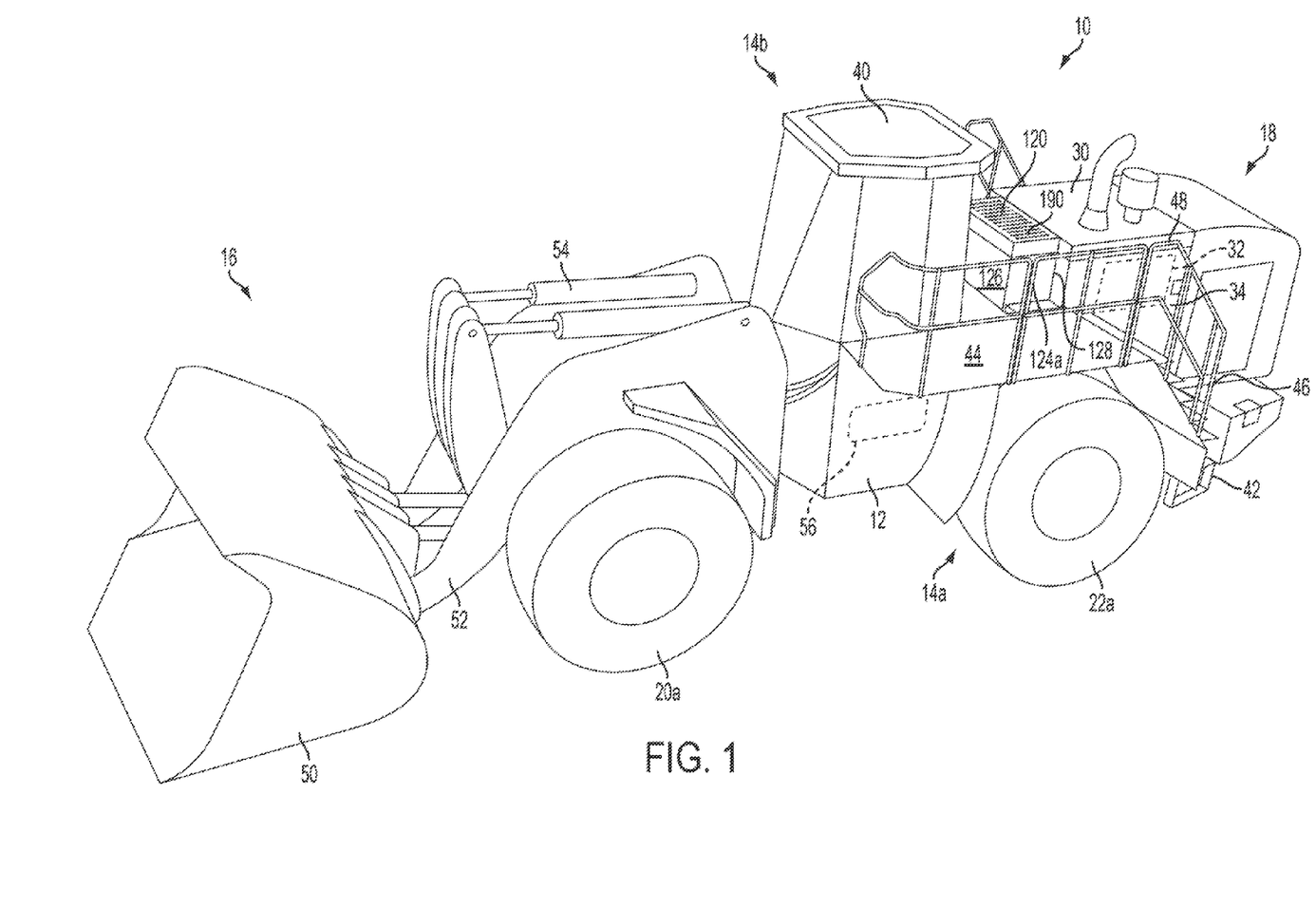
FIG. 1 is a perspective view of a loader having a cabinet that houses first and second power distribution systems.
Figure 2:
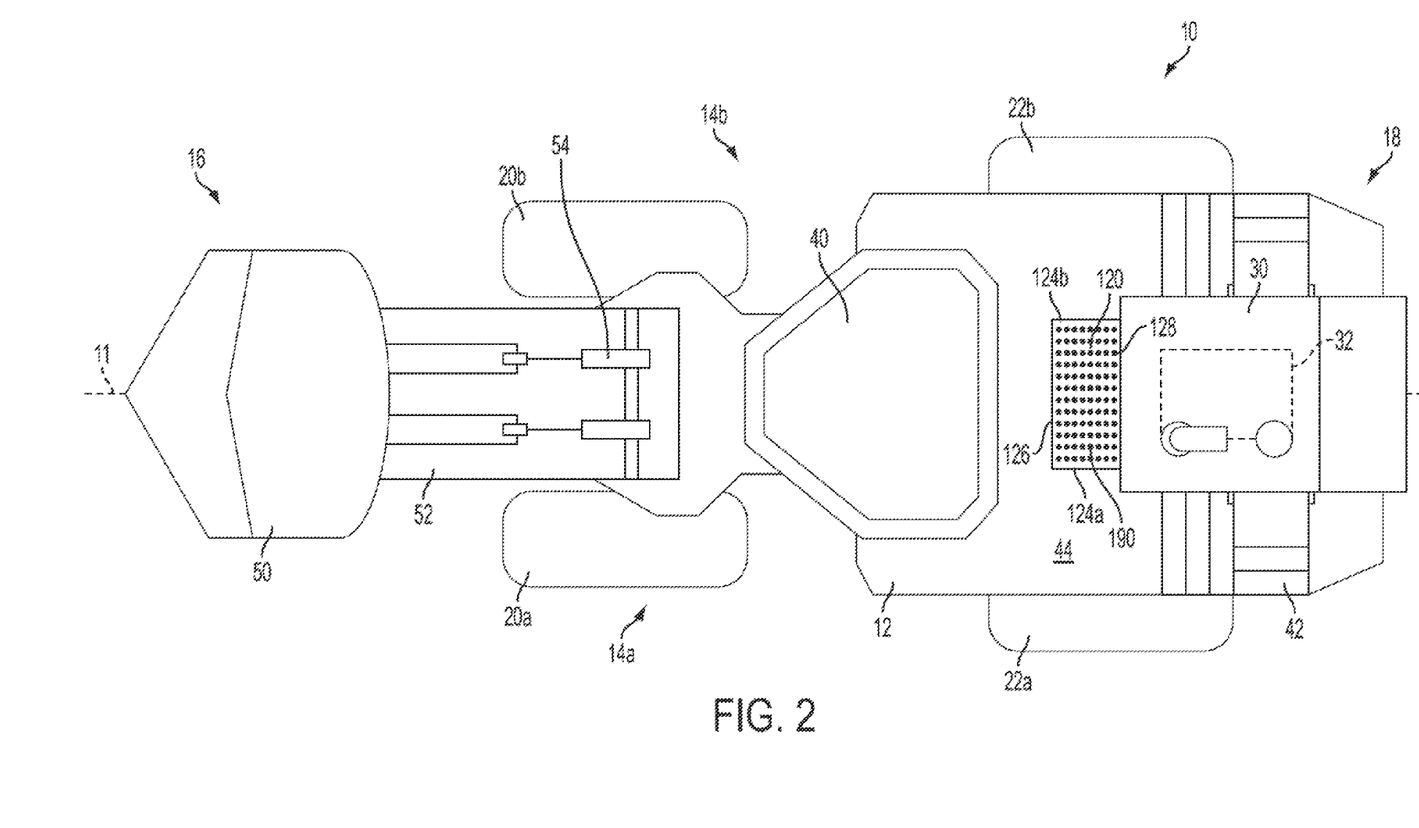
FIG. 2 is a top plan view of the loader of FIG. 1.
Figure 3:
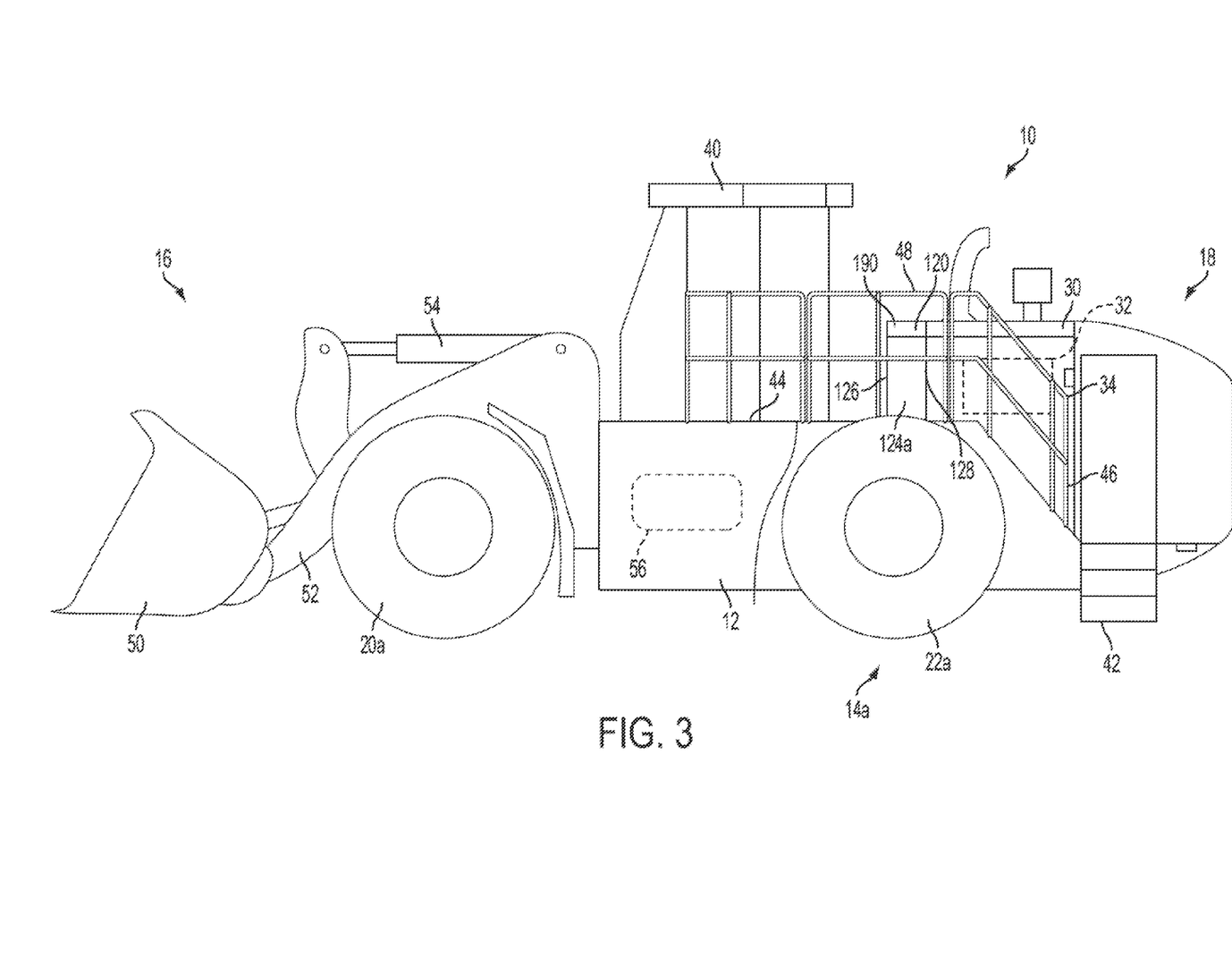
FIG. 3 is side elevational view of the loader of FIG. 1.

Referring to FIGS. 1-3, an electric drive work vehicle is provided in the form of a loader 10. Although the vehicle is illustrated and described herein as loader 10, the vehicle may be in the form of a tractor, a bulldozer, a motor grader, an excavator, or another agricultural or utility electric drive vehicle, for example. As shown in FIG. 2, loader 10 includes longitudinal axis 11. Chassis 12 of loader 10 includes opposing left and right sides 14*a*, 14*b*, that run substantially parallel to longitudinal axis 11 from front end 16 to rear end 18. In certain embodiments, loader 10 is an articulating vehicle, such that front end 16 of chassis 12 is able to pivot relative to rear end 18 of chassis 12.

Loader 10 also includes a plurality of traction devices, illustratively left-side and right-side front wheels 20a, 20b, and left-side and right-side rear wheels 22a, 22b, that cooperate to support chassis 12 above the ground and to propel chassis 12 across the ground. Although loader 10 is shown and described herein as a wheeled loader, it is within the scope of the present disclosure that other types of loaders may be used, such as tracked loaders having belts or steel tracks as the traction devices.

At rear end 18 of loader 10, chassis 12 defines engine housing 30 for enclosing and protecting engine 32, as shown in FIG. 3. Engine housing 30 may include a pivotable door 34 to allow the operator to selectively access engine 32 and other components located inside engine housing 30.

Between front end 16 and rear end 18 of loader 10, chassis 12 supports operator cab 40 for housing and protecting the operator of loader 10. Operator cab 40 may include foot pedals, a steering wheel, joysticks, monitors, and other controls (not shown) for operating loader 10. The operator is able to access operator cab 40 by climbing steps 42 and then walking across platform 44, preferably while gripping handle bars 46 and railings 48. In the illustrated embodiment of FIG. 1, platform 44 runs along left side 14a of chassis 12 above the left-side rear wheel 22a and along right side 14b of chassis 12 above the right-side rear wheel 22b.

At front end 16 of loader 10, chassis 12 supports a work tool in the form of bucket 50. Other suitable work tools include, for example, blades, forks, tillers, and mowers. Bucket 50 is moveably coupled to chassis 12 via linkage 52 for picking up or scooping dirt and other materials from the ground and for carrying and dumping such materials. In use, a plurality of hydraulic cylinders 54 receive pressurized hydraulic fluid from tank 56 (FIG. 3) to move bucket 50 relative to linkage 52 and to move linkage 52 relative to chassis 12. The operator may control hydraulic cylinders 54 using joysticks or other controls (not shown) located within operator cab 40. In the illustrated embodiment of FIG. 3, tank 56 is under-mounted to chassis 12 beneath platform 44.

Figure 4:
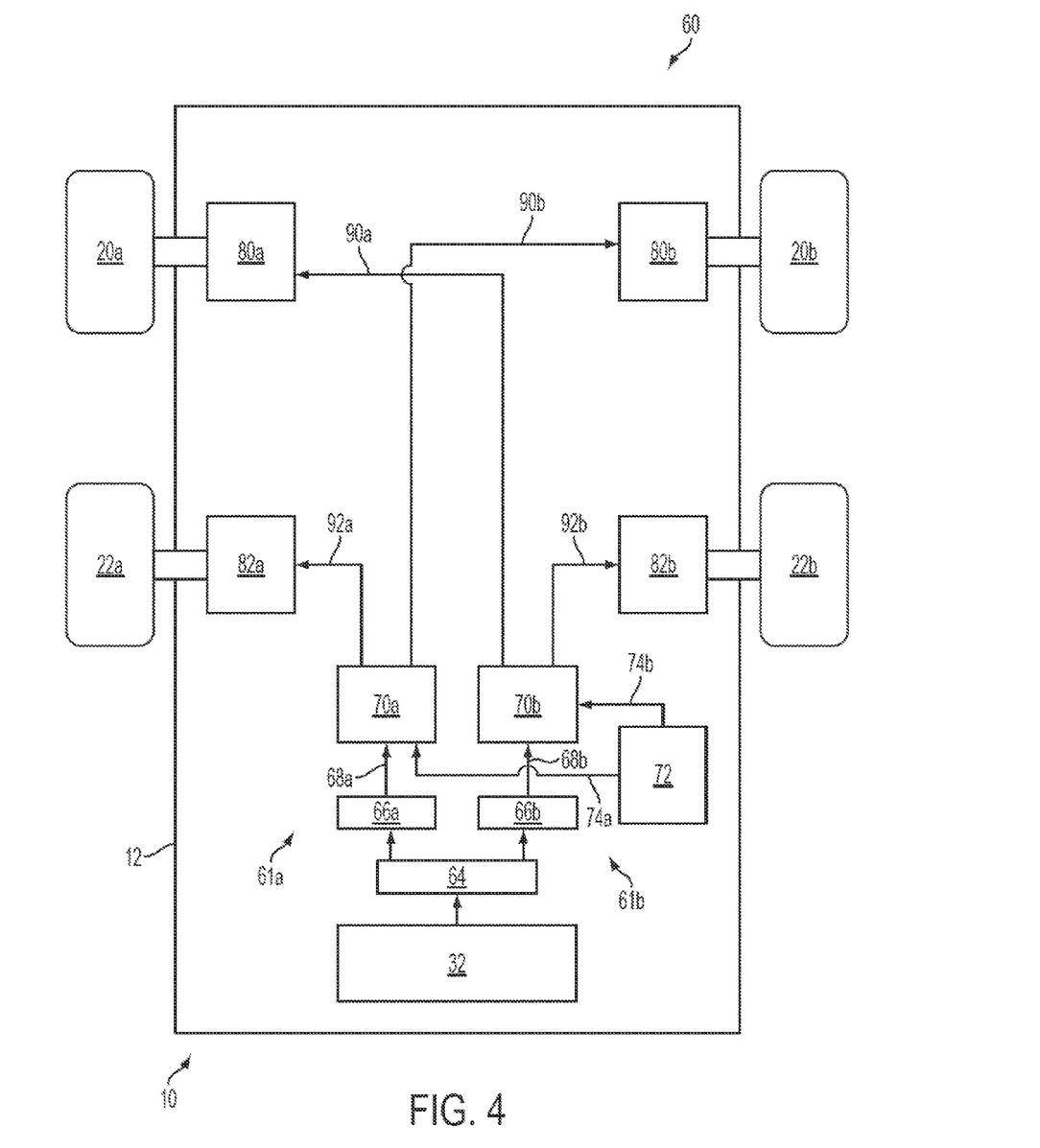
FIG. 4 is schematic diagram representing an electric drive system of the loader of FIG. 1.

Referring next to FIG. 4, an electric drive system 60 of loader 10 is illustrated schematically. The electric drive system 60 of FIG. 4 is a dual system having two distinct power paths 61a, 61b, but it is also within the scope of the present disclosure that a single power path may be provided.

The illustrative electric drive system 60 of FIG. 4 includes engine 32, which is illustratively an internal combustion engine. Engine 32 is coupled to fuel source (not shown) to receive a suitable fuel (e.g., diesel fuel). The output of engine 32 is mechanically coupled to the input of gearbox 64, and the output of gearbox 64 is mechanically coupled to first and second generators 66a, 66b, which convert mechanical energy from engine 32 to electrical energy. Each generator 66a, 66b, may be configured as a three-phase interior-permanent-magnet (IPM) synchronous generator, for example. Although the electrical power source of electric drive system 60 is illustrated and described herein as an arrangement of internal combustion engine 32 and generators 66a, 66b, it is also within the scope of the present disclosure that the electrical power source may be a battery arrangement, a fuel cell arrangement, or combinations thereof.

The illustrative electric drive system 60 of FIG. 4 also includes first and second power distribution systems 70a, 70b. Each generator 66a, 66b, is coupled to a corresponding power distribution system 70a, 70b, via first and second power cables 68a, 68b, respectively. Each power cable 68a, 68b, may include multiple electrical cables, and each electrical cable may include one or more electrical conductors.

The illustrative electric drive system 60 of FIG. 4 further includes controller 72, which may include appropriate sensors, controllers, microcontrollers, microprocessors, digital signal processors, memory modules, or other electronic components. As shown in FIG. 4, controller 72 communicates with power distribution systems 70a, 70b, via communication cables 74a, 74b, respectively, for sending control signals, such as ground speed signals, steering signals, and braking signals, to power distribution systems 70a, 70b. Controller 72 may also provide control functionalities to other components of loader 10, such as engine 32.

The illustrative electric drive system 60 of FIG. 4 still further includes a left-side front traction motor 80a (which is configured to drive the corresponding left-side front wheel 20a), a right-side front traction motor 80b (which is configured to drive the corresponding right-side front wheel 20b), a left-side rear traction motor 82a (which is configured to drive the corresponding left-side rear wheel 22a), and a right-side rear traction motor 82b (which is configured to drive the corresponding right-side rear wheel 22b). Although four traction motors 80a, 80b, 82a, 82b, are illustrated and described herein, it is within the scope of the present disclosure that electric drive system 60 of loader 10 may have more than four or less than four traction motors, depending on the intended application. Each traction motor 80a, 80b, 82a, 82b, may be configured as a three-phase switched reluctance (SR) motor, for example.

Each power distribution system 70a, 70b, manages the interconnection between generators 66a, 66b, and traction motors 80a, 80b, 82a, 82b. As discussed further below, each power distribution system 70a, 70b, contains sufficient microprocessor and power semiconductor technology, which may be in the form of distinct power electronics modules, to monitor and/or regulate the attached generators 66a, 66b, and traction motors 80a, 80b, 82a, 82b. For example, based on the control signals received from controller 72, the modules of power distribution systems 70a, 70b, may be configured to selectively supply the necessary electrical power to traction motors 80a, 80b, 82a, 82b. Additionally, the modules of power distribution systems 70a, 70b, may be configured as power inverters to convert the power from generators 66a, 66b, to a form suitable for use by fraction motors 80a, 80b, 82a, 82b.

In the illustrated embodiment of FIG. 4, power distribution systems 70a, 70b, operate in a "crosswise" or "quasi-parallel" manner. The first power distribution system 70a selectively supplies electrical power to the right-side front traction motor 80b via power cable 90b and, at the opposite corner of loader 10, to the left-side rear traction motor 82a via power cable 92a. The second power distribution system 70b selectively supplies electrical power to the left-side front traction motor 80a via power cable 90a and, at the opposite corner of loader 10, to the right-side rear fraction motor 82b via power cable 92b. This "crosswise" arrangement balances power distribution to the left and right sides 14a, 14b, of loader 10. For example, if wheels 20a, 22a, on the left side 14a of loader 10 lose traction, such as when traveling on a sloping hill, the tractive load on the right side 14b of loader 10 will be distributed between both power distribution systems 70a, 70b. Each power cable 90a, 90b, 92a, 92b, may include one or more electrical conductors. It is also within the scope of the present disclosure that the connections between power distribution systems 70a, 70b, and fraction motors 80a, 80b, 82a, 82b, may vary from the arrangement depicted in FIG. 4.

Figure 5:
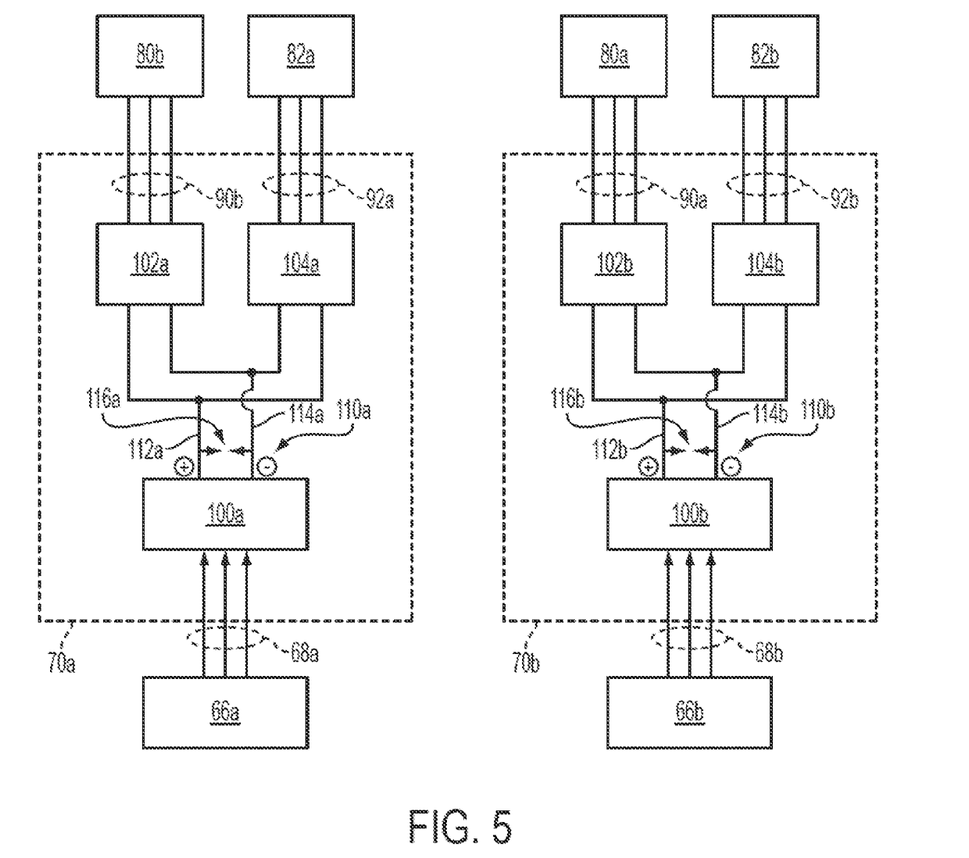
FIG. 5 is a schematic diagram representing the first and second power distribution systems of FIG. 1.

Referring next to FIG. 5, the first and second power distribution systems 70a, 70b, are shown and described in more detail. As discussed above, each power distribution system 70a, 70b, may include a plurality of distinct power electronics modules for managing the interconnection between generators 66a, 66b, and traction motors 80a, 80b, 82a, 82b. In the illustrated embodiment of FIG. 5, the first power distribution system 70a includes a first module 100a associated with the first generator 66a, a second module 102a associated with the right-side front traction motor 80b, and a third module 104a associated with the left-side rear traction motor 82a. The second power distribution system 70b includes a first module 100b associated with the second generator 66b, a second module 102b associated with the left-side front traction motor 80a, and a third module 104b associated with the right-side rear traction motor 82b.

The first modules 100a, 100b, of each power distribution system 70a, 70b, may include power converters in the form of AC-to-DC converters. The first modules 100a, 100b, may receive three-phase AC power inputs from the respective generators 66a, 66b, via power cables 68a, 68b, and may output DC power to a corresponding power bus assembly 110a, 110b. The first modules 100a, 100b, may also be configured to control the operation of brake resistors (not shown) to dissipate power from the corresponding power bus assembly 110a, 110b.

As shown in FIG. 5, each power bus assembly 110a, 110b, includes a positive power rail 112a, 112b, and a negative power rail 114a, 114b. The power bus assemblies 110a, 110b, may supply power at a nominal voltage of, for example, 700 V, and may be configured in a low inductance configuration, so as to minimize the amount of capacitance required for modules 100a, 100b, 102a, 102b, 104a, 104b, of power distribution systems 70a, 70b. Capacitors 116a, 116b, are provided between the positive power rail 112a, 112b, and the negative power rail 114a, 114b, of each power bus assembly 110a, 110b.

The second modules 102a, 102b, and the third modules 104a, 104b, of each power distribution system 70a, 70b, may include power converters in the form of DC-to-AC inverters. The second modules 102a, 102b, and the third modules 104a, 104b, may receive DC power from the corresponding power bus assembly 110a, 110b, and may output three-phase AC power to the corresponding traction motors 80a, 80b, 82a, 82b, via power cables 90a, 90b, 92a, 92b.

Additional details of power distribution systems 70a, 70b, including modules 100a, 100b, 102a, 102b, 104a, 104b, of power distribution systems 70a, 70b, may be disclosed in U.S. Pat. No. 7,808,775 to Cherney et al., entitled "Modular Power Distribution System Having a Sealing Arrangement for Use In a Work Machine," the disclosure of which is expressly incorporated herein by reference.

Figure 6:
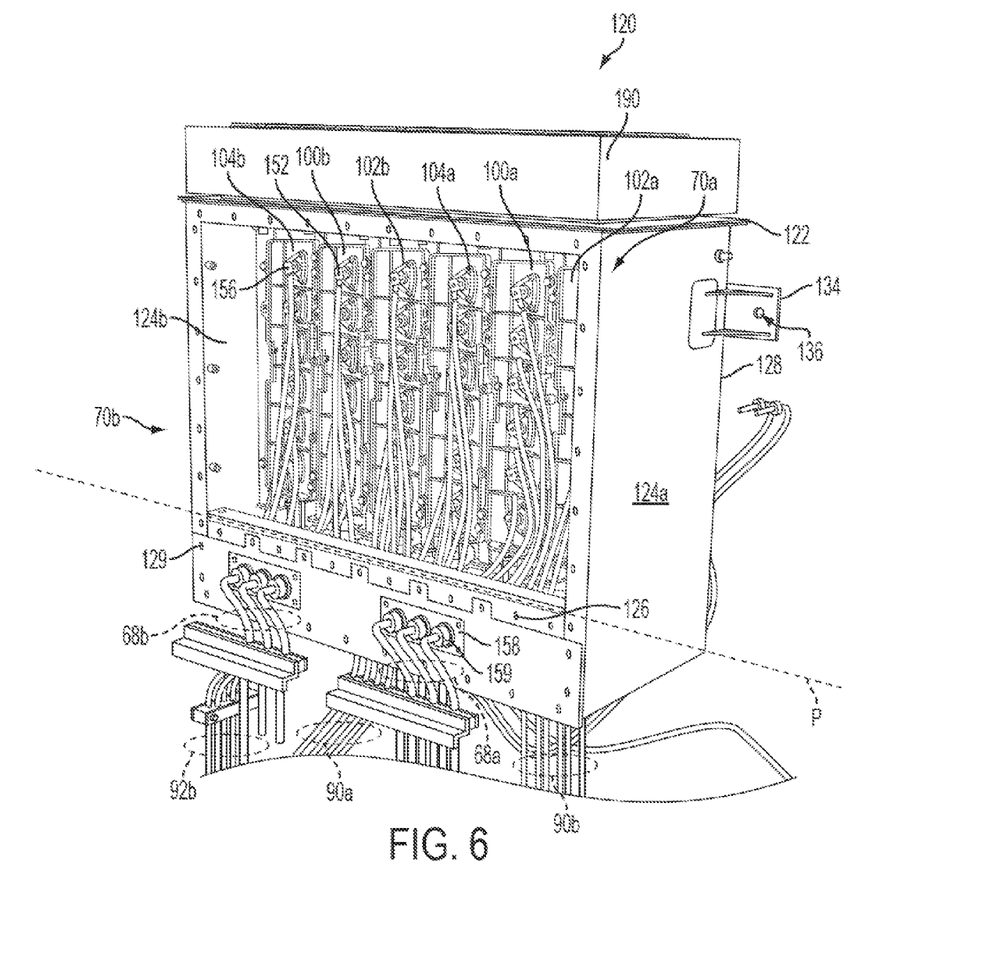
FIG. 6 is a perspective view of the cabinet and the first and second power distribution systems of FIG. 1, the cabinet shown with a plurality of incoming and outgoing power cables.
Figure 7:
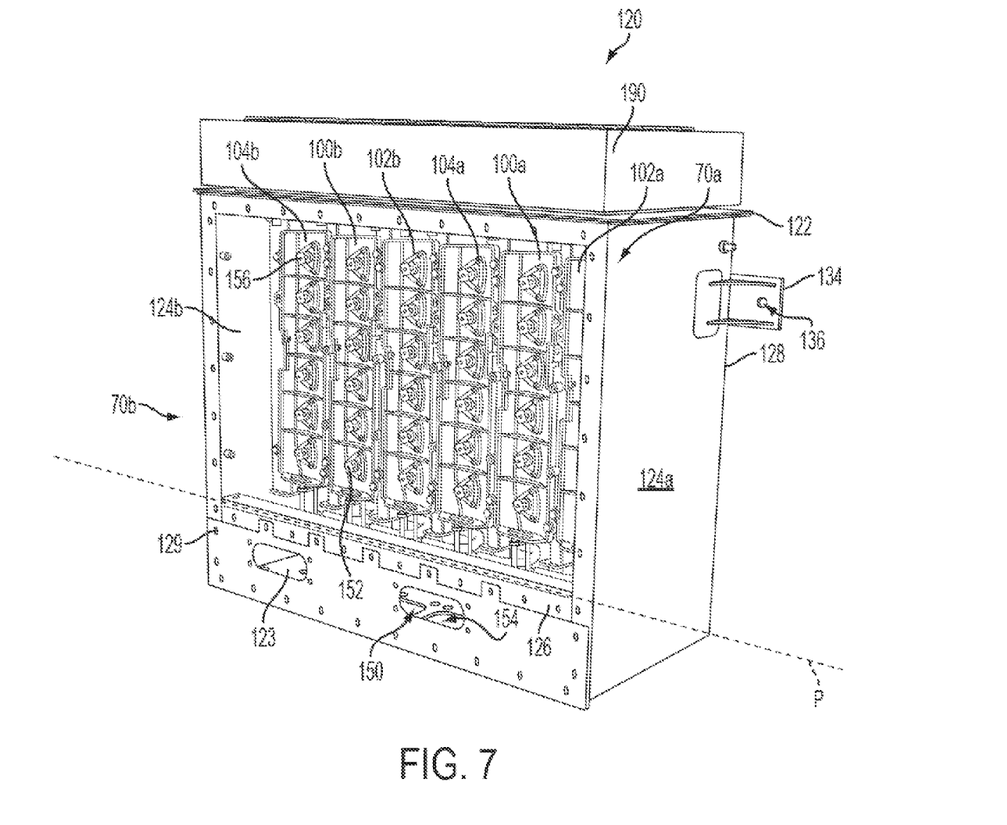
FIG. 7 is a perspective view similar to FIG. 4, the cabinet shown without the plurality of incoming and outgoing power cables.
Figure 8:
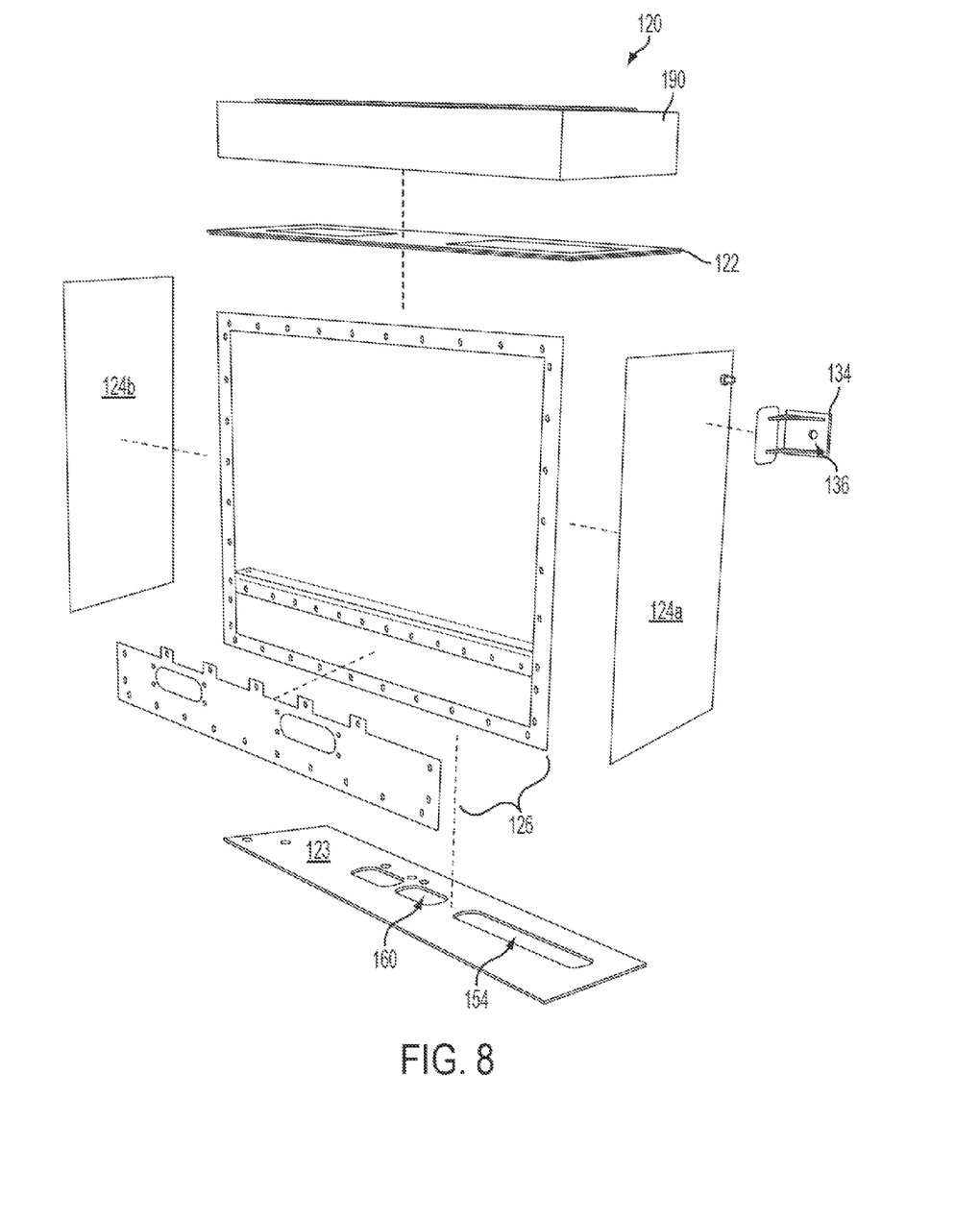
FIG. 8 is an exploded perspective view of the cabinet of FIG. 1.

Referring next to FIGS. 6-8, a housing or cabinet 120 is provided to enclose and protect power distribution systems 70a, 70b. The illustrative cabinet 120 is metallic and generally rectangular in shape and includes a top panel 122, a bottom panel 123, a left-side panel 124a that faces the left side 14a of loader 10, a right-side panel 124b that faces the right side 14b of loader 10, a front panel 126 that faces front end 16 of loader 10, and a rear panel 128 that faces rear end 18 of loader 10. Adjacent panels 122, 123, 124a, 124b, 126, 128, may be coupled together integrally, by welding, or using suitable mechanical fasteners 129, such as bolts, screws, or latches, to define the protective enclosure around power distribution systems 70a, 70b. It is within the scope of the present disclosure that one or more panels 122, 123, 124a, 124b, 126, 128, of cabinet 120 may be at least partially transparent to allow the operator to see power distribution systems 70a, 70b, contained therein.

As shown in FIGS. 5 and 6, power cables 68a, 68b, provide inputs to the first modules 100a, 100b, of power distribution systems 70a, 70b. To accommodate the incoming power cables 68a, 68b, the illustrative cabinet 120 defines a plurality of inlet openings 150, as shown in FIG. 7. In the illustrated embodiment of FIG. 8, inlet openings 150 are located in the front panel 126 of cabinet 120. The first modules 100a, 100b, also include suitable connectors 152, which may be in the form of robust lug terminals, for connecting to the associated power cables 68a, 68b.

Also, as shown in FIGS. 5 and 6, power cables 90a, 90b, 92a, 92b, provide outputs from the second modules 102a, 102b, and the third modules 104a, 104b, of power distribution systems 70a, 70b. To accommodate the outgoing power cables 90a, 90b, 92a, 92b, the illustrative cabinet 120 defines a plurality of outlet openings 154, as shown in FIG. 7. In the illustrated embodiment of FIG. 8, outlet openings 154 are located in the bottom panel 123 of cabinet 120. In this manner, power cables 90a, 90b, 92a, 92b, extend downward through bottom panel 123 of cabinet 120 for connecting to traction motors 80a, 80b, 82a, 82b. The second modules 102a, 102b, and the third modules 104a, 104b, also include suitable connectors 156, which may be in the form of robust lug terminals, for connecting to the associated power cables 90a, 90b, 92a, 92b.

To reduce electromagnetic emissions from cabinet 120, inlet openings 150 and/or outlet openings 154 in cabinet 120 may be shielded by suitable electromagnetic interference (EMI) shields. For example, EMI-gasketed cover assemblies or plates 158 may be coupled to cabinet 120 adjacent to inlet openings 150 and/or outlet openings 154. Cover assemblies 158 may be manufactured using adhesive-backed EMI gaskets, such as the GORE-SHIELD® adhesive-backed EMI gaskets commercially available from W. L. Gore & Associates, Inc. of Newark, Del. Also, circular EMI seals 159, also known as gland seals, may surround power cables 68a, 68b, 90a, 90b, 92a, 92b, at locations adjacent to cabinet 120. Suitable EMI shields may also be provided at other locations of cabinet 120, such as between adjacent panels 122, 123, 124a, 124b, 126, 128, of cabinet 120. When cabinet 120 is assembled, panels 122, 123, 124a, 124b, 126, 128, the EMI-gasketed cover assemblies 158, and the EMI shields 159 all cooperate to form a Faraday cage to reduce EMI. In addition to reducing EMI, panels 122, 123, 124a, 124b, 126, 128, the EMI-gasketed cover assemblies 158, and the EMI shields 159 also cooperate to block entry of debris and water into cabinet 120.

Figure 12:
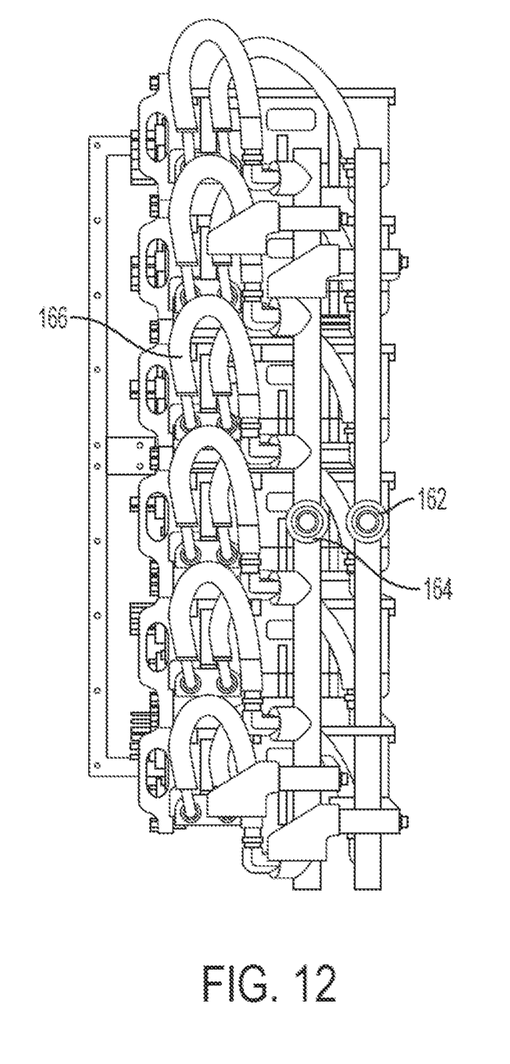
FIG. 12 is a bottom plan view of the first and second power distribution systems of FIG. 1.

Cabinet 120 may also define one or more openings 160 to accommodate various cooling lines. In the illustrated embodiment of FIG. 8, opening 160 is centrally located in the bottom panel 123 of cabinet 120. In this manner, an incoming, cold-water supply line (not shown) may be coupled to the downward-facing fluid inlet port 162 and an outgoing, warm-water discharge line (not shown) may be coupled to the downward-facing fluid outlet port 164, with fluid inlet port 162 and fluid outlet port 164 being shown in FIG. 12. From fluid inlet port 162, cooling water is directed around and between modules 100a, 100b, 102a, 102b, 104a, 104b, via a plurality of fluid conduits 166 to cool the contents of cabinet 120. Fluid conduits 166 may be configured to vent from their highest elevational points, such as near top panel 122 of cabinet 120. After the water in fluid conduits 166 is heated, the water eventually exits cabinet 120 through fluid outlet port 164.

Figure 9:
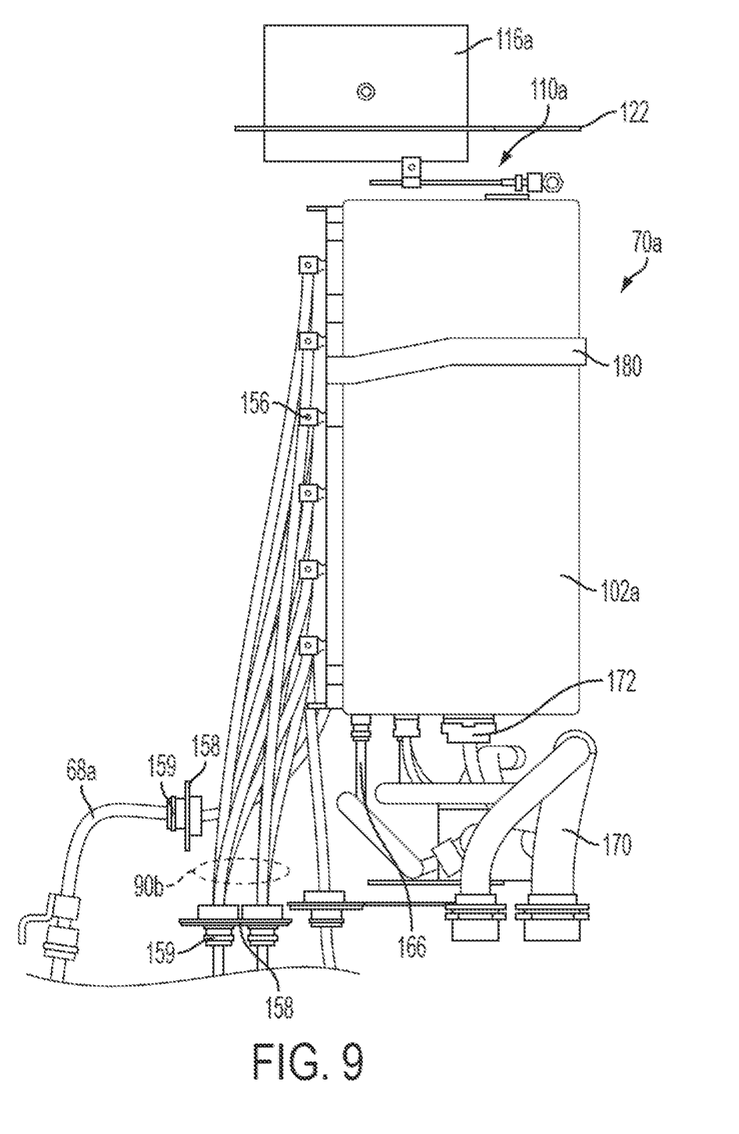
FIG. 9 is a side elevational view of the first and second power distribution systems of FIG. 1 shown with the plurality of incoming and outgoing power cables.

Openings 154 and/or openings 160 in the bottom panel 123 of cabinet 120 may also accommodate various electrical cables 170 for supplying operational electrical power to modules 100a, 100b, 102a, 102b, 104a, 104b. Electrical cables 170 may be low-voltage cables that are shielded and grounded. As shown in FIG. 9, each module 100a, 100b, 102a, 102b, 104a, 104b, includes low-voltage electrical connectors 172 for connecting to electrical cables 170.

Figure 10:
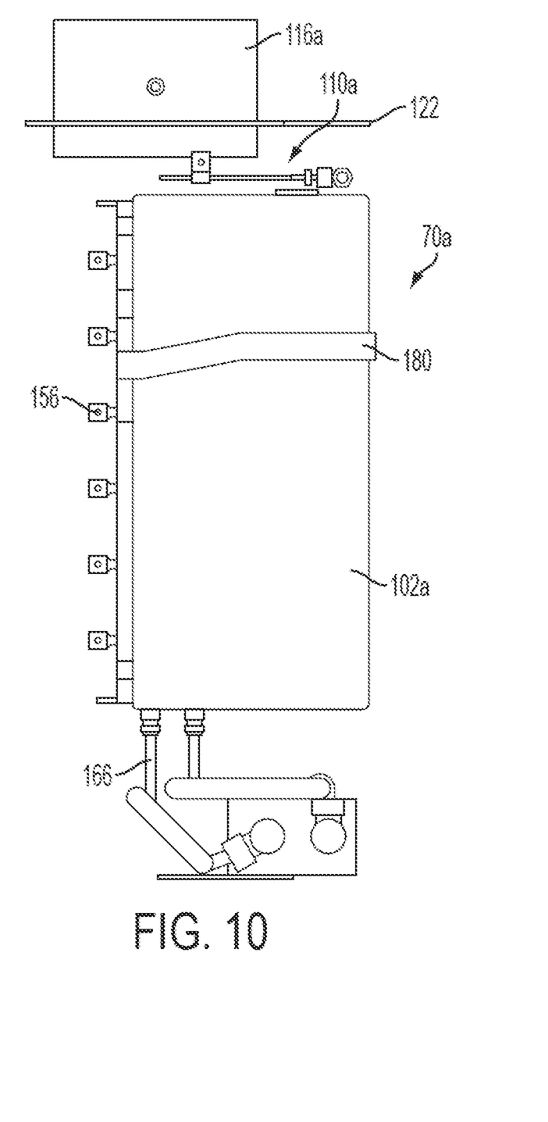
FIG. 10 is a side elevational view similar to FIG. 9, the first and second power distribution systems shown without the plurality of incoming and outgoing power cables.
Figure 11:
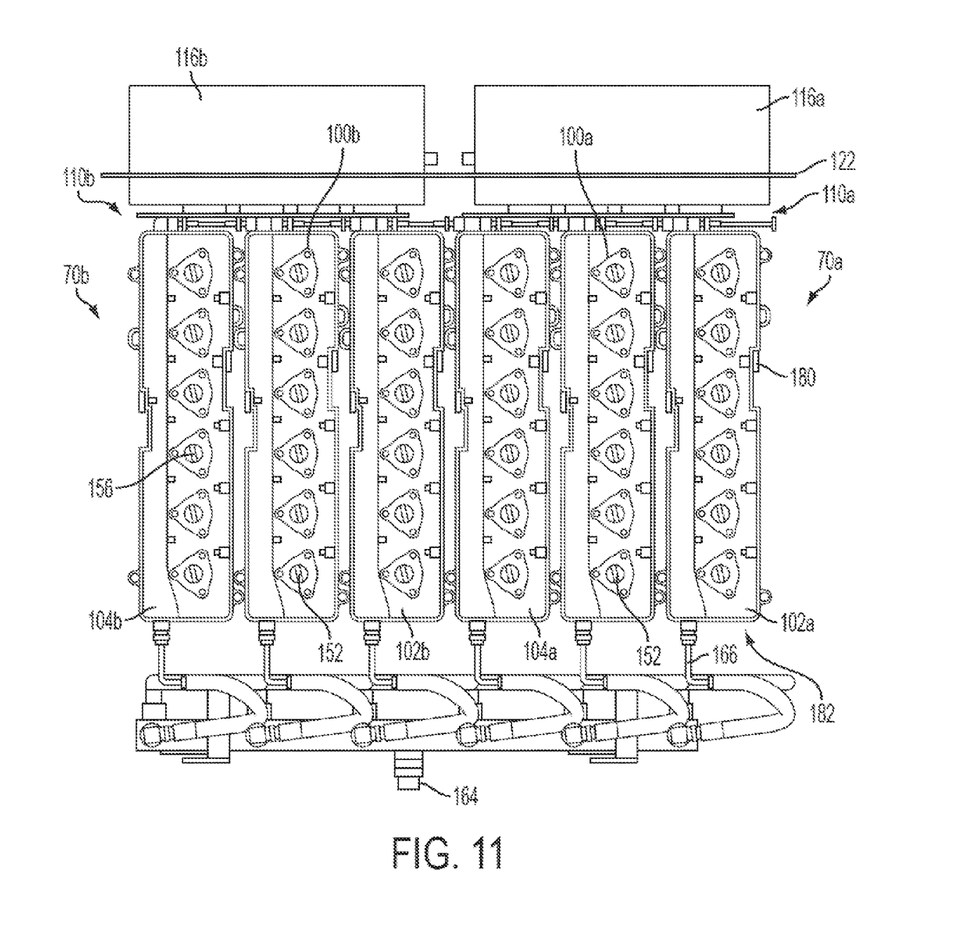
FIG. 11 is a front elevational view of the first and second power distribution systems of FIG. 1.

Referring next to FIGS. 9-11, one or more racks 180 may be provided within cabinet 120 for receiving and holding power distribution systems 70a, 70b. As shown in FIG. 11, the illustrative rack 180 includes a plurality of openings or slots 182, each slot 182 being sized to slidably receive and hold a corresponding module 100a, 100b, 102a, 102b, 104a, 104b, of power distribution systems 70a, 70b. Rack 180 may include suitable clamping mechanisms (not shown) to secure modules 100a, 100b, 102a, 102b, 104a, 104b, in place. Additional details of rack 180 may be disclosed in the above-incorporated U.S. Pat. No. 7,808,775 to Cherney et al.

Power bus assemblies 110a, 110b, may be mounted atop rack 180, as shown in FIG. 11. With modules 100a, 100b, 102a, 102b, 104a, 104b, installed in rack 180, power bus assemblies 110a, 110b, receive electrical power from the first modules 100a, 100b, and supply electrical power to the second modules 102a, 102b, and the third modules 104a, 104b (see also FIG. 5). In certain embodiments, each module 100a, 100b, 102a, 102b, 104a, 104b, includes a three-pronged (i.e., positive, negative, and ground prongs), female electrical connector (not shown) that plugs into a male electrical connector (not shown) of the corresponding power bus assembly 110a, 110b.

Capacitors 116a, 116b, may also be mounted atop rack 180, as shown in FIG. 11. Capacitors 116a, 116b, may be spaced apart from each other and from modules 100a, 100b, 102a, 102b, 104a, 104b, for better serviceability. According to an exemplary embodiment of the present disclosure, capacitors 116a, 116b, are exposed to ambient air by projecting out of cabinet 120 through the top panel 122. The ambient air surrounding loader 10 provides an efficient and reliable cooling source for capacitors 116a, 116b, which may extend the life of capacitors 116a, 116b. A perforated or vented lid 190 may be provided to protect capacitors 116a, 116b, from physical damage and to shield capacitors 116a, 116b, from direct solar rays, while still allowing ambient air to enter lid 190 and reach capacitors 116a, 116b.

Returning to FIGS. 1-3, the illustrative cabinet 120 is mounted atop chassis 12 of loader 10. According to an exemplary embodiment of the present disclosure, a majority of cabinet 120 extends above platform 44 of chassis 12. In the illustrated embodiment of FIG. 6, the approximate location of platform 44 relative to cabinet 120 is represented by plane P. Locating cabinet 120 atop chassis 12 shields cabinet 120 and its contents from ground water and debris, such as dirt and rocks. Also, locating cabinet 120 atop chassis 12 and atop tank 56 (FIG. 3) shields cabinet 120 and its contents from any hydraulic fluid that may leak from tank 56.

The remaining, lower portion of cabinet 120 may extend beneath platform 44 of chassis 12. Again, in the illustrated embodiment of FIG. 6, the approximate location of platform 44 relative to cabinet 120 is represented by plane P. In this embodiment, platform 44 of chassis 12 may provide additional protection for the base of cabinet 120, as well as the components that are entering and exiting the base of cabinet 120, such as power cables 68a, 68b, 90a, 90b, 92a, 92b, cooling lines (not shown), and electrical cables 170.

In a direction parallel to longitudinal axis 11, the illustrative cabinet 120 is located between engine housing 30 and operator cab 40, as shown in FIG. 2. Also, in a direction perpendicular to longitudinal axis 11, the illustrative cabinet 120 is substantially centered on platform 44 approximately halfway between the left and right sides 14a, 14b, of chassis 12. This central location of cabinet 120 may protect cabinet 120 and its contents in the event that loader 10 collides with an obstruction or another vehicle, for example. In the illustrated embodiment of FIGS. 2 and 3, the rear panel 128 of cabinet 120 abuts engine housing 30. In certain embodiments, cabinet 120 and engine housing 30 are substantially the same height.

Cabinet 120 may be secured to chassis 12, engine housing 30, and/or platform 44. For example, in one embodiment, the side panels 124a, 124b, of cabinet 120 include rear-facing brackets 134 for securing cabinet to engine housing 30. Each bracket 134 defines an aperture 136 for driving a mechanical fastener (not shown), such as a bolt or a screw, into engine housing 30.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains and which fall within the limits of the appended claims.

The invention claimed is:

1. An electric drive work vehicle having a front end and a rear end, a longitudinal axis extending from the front end to the rear end of the work vehicle, the work vehicle including:
    a chassis;
    an operator cab supported by the chassis, the operator cab housing an operator of the work vehicle;
    a platform supported by the chassis, the platform providing access to the operator cab;
    an engine;
    at least one traction device positioned to support the chassis on the ground;
    at least one electric traction motor operatively coupled to the at least one traction device to propel the chassis across the ground;
    at least one power distribution system that distributes power from the engine to the at least one electric traction motor; and
    a cabinet that houses the at least one power distribution system, at least a portion of the cabinet being located above the platform and longitudinally forward of the engine, and the cabinet being recessed in the platform such that another portion of the cabinet extends beneath the platform.

2. The work vehicle of claim 1, wherein the cabinet is located longitudinally rearward of the operator cab.

3. The work vehicle of claim 1, wherein the platform surrounds at least two sides of the cabinet.

4. The work vehicle of claim 1, wherein the at least one power distribution system includes a first power distribution system and a second power distribution system, the first power distribution system distributing power from the engine to a right-side front traction motor and a left-side rear traction motor, the second power distribution system distributing power from the engine to a left-side front traction motor and a right-side rear traction motor, the cabinet housing the first and second power distribution systems.

5. The work vehicle of claim 1, wherein the at least one power distribution system includes a capacitor that projects out of the cabinet for exposure to ambient air.

6. The work vehicle of claim 5, further including a perforated lid that covers the capacitor while permitting exposure to ambient air.

7. The work vehicle of claim 1, further including an engine housing supported by the chassis and surrounding the engine, wherein the cabinet is located longitudinally between the operator cab and the engine housing.

8. The work vehicle of claim 7, wherein a rear panel of the cabinet abuts the engine housing.

9. The work vehicle of claim 7, wherein the cabinet includes a rear-facing bracket that is configured to receive a fastener to fasten the cabinet to the engine housing.

10. The work vehicle of claim 1, further including:
a bucket moveably coupled to the chassis at the front end of the work vehicle;
at least one hydraulic cylinder configured to move the bucket relative to the chassis; and
a tank in fluid communication with the at least one hydraulic cylinder to supply hydraulic fluid to the at least one hydraulic cylinder, wherein the cabinet is located above the tank.

11. An electric drive work vehicle having a front end and a rear end, a longitudinal axis extending from the front end to the rear end of the work vehicle, the work vehicle including:
a chassis;
a work tool moveably coupled to the chassis;
at least one hydraulic cylinder configured to move the work tool relative to the chassis;
a tank in fluid communication with the at least one hydraulic cylinder to supply hydraulic fluid to the at least one hydraulic cylinder;
an operator cab supported by the chassis, the operator cab housing an operator of the work vehicle;
a power source;
at least one traction device positioned to support the chassis on the ground;
at least one electric traction motor operatively coupled to the at least one traction device to propel the chassis across the ground;
at least one power distribution system that distributes power from the power source to the at least one electric traction motor; and
a cabinet that houses the at least one power distribution system, the cabinet being located above the tank.

12. The work vehicle of claim 11, wherein the cabinet is located longitudinally rearward of the work tool.

13. The work vehicle of claim 11, wherein the work tool is moveably coupled to the chassis at the front end of the work vehicle.

14. The work vehicle of claim 11, wherein the work tool is a bucket that is configured to contact the ground to pick up material from the ground.

15. The work vehicle of claim 11, further including a platform supported by the chassis, the platform providing access to the operator cab, wherein at least a portion of the cabinet is located above the platform.

16. The work vehicle of claim 11, wherein an inlet port and an outlet port of a fluid conduit are accessible through at least one opening in the cabinet, the fluid conduit configured to convey a cooling fluid throughout the cabinet.

17. An electric drive work vehicle having a front end and a rear end, a longitudinal axis extending from the front end to the rear end of the work vehicle, the work vehicle including:
a chassis;
a work tool moveably coupled to the chassis at the front end of the work vehicle;
at least one hydraulic cylinder configured to move the work tool relative to the chassis;
a tank in fluid communication with the at least one hydraulic cylinder to supply hydraulic fluid to the at least one hydraulic cylinder;
an operator cab supported by the chassis, the operator cab housing an operator of the work vehicle;
a platform supported by the chassis, the platform providing access to the operator cab;
a power source;
at least one traction device positioned to support the chassis on the ground;
at least one electric traction motor operatively coupled to the at least one traction device to propel the chassis across the ground;
at least one power distribution system that distributes power from the power source to the at least one electric traction motor; and
a cabinet that houses the at least one power distribution system, at least a portion of the cabinet being located above the platform and longitudinally rearward of the work tool, and the cabinet being positioned above the tank.

18. The work vehicle of claim 17, wherein the operator cab is located longitudinally between the work tool and the cabinet.

19. The work vehicle of claim 17, wherein, in a direction perpendicular to the longitudinal axis, the cabinet is substantially centered on the platform.

20. The work vehicle of claim 17, wherein the cabinet defines an opening that receives an electrical cable, the cabinet further including at least one electromagnetic interference shield adjacent to the opening.

21. The work vehicle of claim 20, wherein the at least one electromagnetic interference shield includes a cover plate or an annular seal.

22. The work vehicle of claim 1, wherein at least a portion of the cabinet is exposed to ambient air around the chassis.

23. An electric drive work vehicle having a front end and a rear end, a longitudinal axis extending from the front end to the rear end of the work vehicle, the work vehicle including:
a chassis;
an operator cab supported by the chassis, the operator cab housing an operator of the work vehicle;
a platform supported by the chassis, the platform providing access to the operator cab;
an engine;
at least one traction device positioned to support the chassis on the ground;
at least one electric traction motor operatively coupled to the at least one traction device to propel the chassis across the ground;
at least one power distribution system that distributes power from the engine to the at least one electric traction motor, the at least one power distribution system including a capacitor; and
a cabinet that houses the at least one power distribution system, the capacitor projecting out of the cabinet for exposure to ambient air, and at least a portion of the cabinet being located above the platform and longitudinally forward of the engine.

* * * * *